Feb. 7, 1928.  A. WEILAND  1,658,750

UNIVERSAL JOINT

Filed Sept. 30, 1926

Inventor
Alfred Weiland,
By Robert M. Barr.
Attorney

Patented Feb. 7, 1928.

1,658,750

UNITED STATES PATENT OFFICE.

ALFRED WEILAND, OF NESHANIC, NEW JERSEY, ASSIGNOR TO PNEUMATIC APPLIANCES CORPORATION, OF NEW YORK, N. Y., A CORPORATION OF DELAWARE.

UNIVERSAL JOINT.

Application filed September 30, 1926. Serial No. 138,667.

The present invention relates to means for transmitting power from a driving element to a driven element, and relates more particularly to an improved universal joint connection.

Some of the objects of the present invention are to provide an improved universal joint; to provide a self-contained universal joint including a flexible casing; to provide means for transmitting power by way of a universal joint through a resilient medium; to provide a universal joint including a resilient casing with means for permitting play or lost motion axially of the joint; to provide a universal joint having a sealed casing for containing lubricant; to provide a resilient casing to cooperate in the operation of a universal joint, one portion of the casing serving to resist torque and another portion of the casing arranged to yield under forces acting axially of the joint; to provide means for automatically allowing axial slipping of the parts of a universal joint under thrust; and to provide other improvements as will hereinafter appear.

Figure 1:
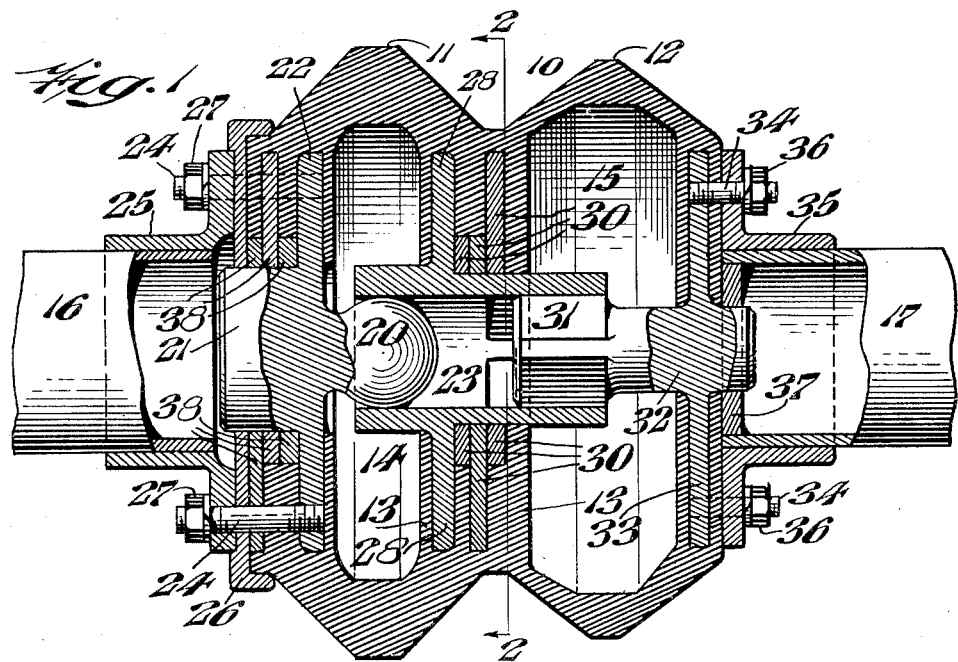
Figure 2:
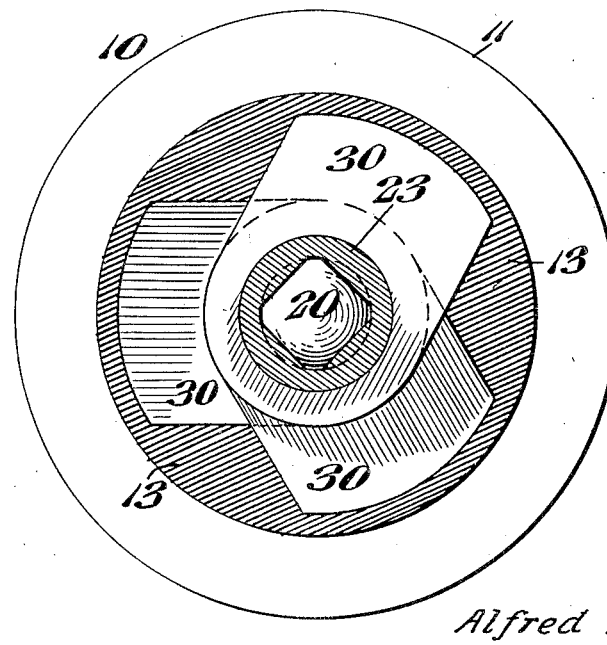

In the accompanying drawings, Fig. 1 represents a sectional elevation of one form of the present invention; and Fig. 2 represents a section on line 2—2 of Fig. 1.

Referring to the drawings, one form of the present invention consists of a casing 10 of resilient material, such as vulcanized rubber molded in the form of two hollow members 11 and 12 interconnected by a relatively heavy wall 13 which divides the casing 10 into chambers 14 and 15. The walls of the member 11 are molded relatively thick to transmit and resist torsional stresses, while the walls of the member 12 are relatively thin in order to give a degree of flexibility under axial thrust.

For giving the required rigidity to the connection between the driving shaft 16 and the driven shaft 17, one side of the member 11 has a ball 20, formed as a part of a centering hub 21 and a flange 22, which in assembled condition projects axially into the chamber 14 and finds a seat in a sleeve socket 23 projecting from the wall 13. The hub 21 and flange 22 are molded into the end wall of the member 11 and the flange 22 carries attached studs 24 which project from the end for clamping the coupling 25 and end plate 26 fast to the member 11 by the nuts 27.

The socket sleeve 23 is rigidly centered by molding it into position in the wall 13, and has a circumferential flange 28 embedded in the wall 13 to assure resistance to displacement. The sleeve 23 has an additional safe-guard to maintain it accurately centered in the provision of three centering plates 30 mounted upon the sleeve 23 in face to face relation but angularly displaced approximately one hundred and twenty degrees one to the other, though this angularity, as well as the number of plates, may be varied without departing from the invention.

Since the walls of the member 11 are relatively thick to transmit the torque from the driving member 16, they do not have the necessary flexibility to take up and allow for the end thrusts transmitted to the joint and which in comparison are relatively light. For example, where the joint of the present invention is applied between the transmission and the rear axle of a motor vehicle, this end thrust takes place under the action of the vehicle springs and consequently the distance between the driving member and the driven member is increasing and decreasing as the vehicle travels along the road. In order to compensate for this end thrust, the sleeve 23, in this instance, opens into the chamber 15 and has for construction convenience, an internal polygonal shape to receive the correspondingly shaped head 31 of a connecting hub 32, the body of which and a circumferential flange 33 are molded into the center of the end of the member 12. The flange 33 has attached studs 34 which in molded, assembled condition project through a flanged coupling 35 and hold the parts rigidly clamped by nuts 36. The coupling 35 connects this end of the casing 10 to the driven shaft 17, and the latter, in this instance, is tubular and receives a centering washer 37 fitting about the end of the hub 32.

In connection with the hub 21, there are centering plates 38 mounted upon it and molded into the member 11 in displaced angular relation where they are held by the clamping action of the studs 24. The end plate 26 also fits about the hub 21 and further assumes correct axial alignment of the hub at all times.

From the foregoing, it will be apparent that a complete unitary self-contained universal joint has been devised wherein a resilient member serves to transmit the torque developed by a driving member while means are provided for automatically compensating for end thrusts received by the joint construction. Furthermore, a unitary casing has been provided wherein one portion functions to transmit the torque load to a driven member while another portion functions to allow the necessary joint slip under thrust. The construction is also such that axial alignment of the joint parts and the driving and driven members is maintained.

While only a single form is shown in which this invention may be embodied, it is to be understood that the invention is not limited to any specific construction, but might be applied to various forms without departing from the spirit of the invention or the scope of the appended claims.

Having thus described my invention, I claim:

1. A universal joint comprising a part to be connected to a driving shaft, a part to be connected to a driven shaft, a universal connection between said parts, means encircling said universal connection for transmitting the driving shaft torque to said driven shaft, and means including a resilient casing for compensating for end thrust on said universal connection.

2. A universal joint comprising a part to be connected to a driving shaft, a part to be connected to a driven shaft, a resilient casing connecting said parts, a universal connection connected between the sides of said casing, an axialy movable connection between said universal connection and said driven shaft, and a resilient casing connected between parts of said axially movable connection.

3. A universal joint comprising a part to be connected to a driving shaft, a part to be connected to a driven shaft, a resilient casing connecting said parts, said casing having relatively thick walls to transmit torque, a universal connection connected between the sides of said casing, an axially movable connection between said universal connection and said driven shaft, and a resilient casing between parts of said axially movable connection, said last casing having relatively thin walls to transmit thrust to said axially movable connection.

4. A universal joint including longitudinally aligned universal and slip joint connections between the proximate ends of a driving shaft and a shaft arranged to be driven thereby, and a torque and axial thrust transmitting unit, said unit consisting of a pair of sealed lubricant receiving chambers arranged respectively to enclose said universal and slip joint connections.

5. A universal joint including longitudinally aligned universal and slip joint connections between the driving and driven shafts, and a resilient unit interposed between said shafts and constituting the torque and axial thrust transmitting means therebetween, said unit consisting of a pair of integrally joined chambers respectively enclosing said universal and slip joint connections.

Signed at Philadelphia, county of Philadelphia, State of Pennsylvania, this 20th day of September, 1926.

ALFRED WEILAND.